(12) United States Patent
Suen et al.

(10) Patent No.: US 10,311,432 B1
(45) Date of Patent: Jun. 4, 2019

(54) INTELLIGENT AUTHENTICATION

(71) Applicant: Wells Fargo Bank, N.A., San Francisco, CA (US)

(72) Inventors: Darrell Lee Suen, San Ramon, CA (US); Sridhar Kotamraju, Fremont, CA (US); Christopher P. Clausen, Novato, CA (US); Melody Su-Shin Kao, San Francisco, CA (US); Christina Z. Ongpin, Burlingame, CA (US); Kevin R. Cieslak, Novato, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 15/899,120

(22) Filed: Feb. 19, 2018

Related U.S. Application Data

(63) Continuation of application No. 14/503,838, filed on Oct. 1, 2014.

(51) Int. Cl.
  *G07F 19/00* (2006.01)
  *G06Q 20/38* (2012.01)
  *G06Q 20/40* (2012.01)

(52) U.S. Cl.
  CPC ........... *G06Q 20/382* (2013.01); *G06Q 20/40* (2013.01)

(58) Field of Classification Search
  CPC ... G06F 19/20; G06F 19/203; G06Q 20/1085; G06Q 20/16
  USPC ......................................... 235/379, 380, 382
  See application file for complete search history.

(56) References Cited

U.S. PATENT DOCUMENTS

| | | | | |
|---|---|---|---|---|
| 7,086,085 B1 * | 8/2006 | Brown | ..................... | G06F 21/31 714/E11.207 |
| 7,614,078 B1 * | 11/2009 | Stieglitz | .................. | H04L 9/321 380/247 |
| 7,908,645 B2 * | 3/2011 | Varghese | ............. | G06Q 20/341 715/773 |
| 8,255,971 B1 * | 8/2012 | Webb | .................. | G06Q 20/4014 705/17 |
| 8,281,379 B2 * | 10/2012 | Noe | ..................... | H04L 63/0815 726/10 |
| 8,533,118 B2 * | 9/2013 | Weller | ..................... | G06F 21/31 705/35 |
| 8,555,355 B2 * | 10/2013 | Rathbun | ............... | H04L 9/3213 726/11 |

(Continued)

*Primary Examiner* — Daniel St Cyr
(74) *Attorney, Agent, or Firm* — Walter Haverfield LLP; James J. Pingor

(57) ABSTRACT

Systems, methods, and other embodiments associated with intelligent authentication. According to one embodiment, a system includes a transaction logic configured to receive transaction metadata associated with an attempted transaction. The transaction logic is also configured to identify a user attempting the attempted transaction. The system further includes an activity logic configured to access an activity log associated with the user. The activity log includes values corresponding to previous transactions made by the user and any additional information provided by $3^{rd}$ party feeds. The activity logic is also configured to compare transaction metadata to the values. The system also includes an authentication logic configured to select an authentication level for the transaction based, at least in part, on the comparison.

20 Claims, 5 Drawing Sheets

(56) References Cited

U.S. PATENT DOCUMENTS 8,584,219 B1 * 11/2013 Toole ................ G06F 21/60
                                                                                  726/25
9,400,877 B2 * 7/2016 Isozaki ............ G06F 21/31
9,625,796 B2 * 4/2017 Priest ............... G03B 21/145

* cited by examiner

INTELLIGENT AUTHENTICATION

CROSS-REFERENCE TO RELATED APPLICATION

This application is a continuation of and claims priority to pending U.S. patent application Ser. No. 14/503,838 entitled INTELLIGENT AUTHENTICATION filed on Oct. 1, 2014. The entirety of the above-noted patent application is incorporated by reference herein.

BACKGROUND

Authentication is a technique for verifying a user. Typically, authentication is standardized for each resource such that each electronic resource is associated with a specific authentication technique. For example, a financial institution may make the online banking interface subject to a username and password combination to authenticate a user and the ATM transaction interface subject to a bank card and personal identification number (PIN) combination to authenticate the user. Thus, the user cannot use the username and password of their online banking tools to access the ATM.

Conventionally, the authentication required for a particular electronic resource is set by the organization and does not change. Suppose that a user logs into online banking from a mobile device to check their balance a block away from an ATM, and then moments later attempts to perform a transaction at the ATM. The authentication technique utilized by the ATM does not change based on the user's previous activity. Accordingly, users are repeatedly required to re-authenticate despite the user's previous activity. Moreover, the user may need to enter different information each time the user is authenticated depending on the particular electronic resource being accessed.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, authentication techniques are typically static and based on the electronic resource or channel (ATM, physical store/branch, virtual, or phone bank) that a user is attempting to access. Authentication describes a number of methodologies used to verify that the user is in fact the user and not a fraudster impersonating the user. Specifically, a user is an individual attempting to access an electronic resource. Before the user is given access to the electronic resource, the user completes authentication to demonstrate that the user is who he/she claims to be. As described above, for example, authentication may include a username and password combination or a bankcard and PIN combination. Other examples of authentication may include biometric security, PIN alone, security questions, multi-factor authentication in which multiple forms of authentication are required that represent more than one of the following—who the person is, what the person knows, and what the person has.

Described herein are examples of systems, methods, and other embodiments associated with intelligent authentication. The systems, methods, and other embodiments described herein use varying levels of authentication based on the likelihood that a user attempting a transaction is the user, and therefore, has authorization to perform the transaction. An organization keeps records of users (i.e., individuals and/or entities authorized to perform transactions). For example, a financial institution maintains records of the activities of users, such as account holders and individuals/entities with signatory authority to enact transactions on an account. A transaction is compared to the user's previous activity to determine a degree of likelihood that the transaction is being attempted by the user and not a fraudster impersonating the user.

In one embodiment, a user's activity throughout his/her lifecycle as a user of electronic resources is recorded in an activity log. The activity log records factors that identify information about the user and the user's transactions. For example, the factors may include time between online banking sessions, duration of online banking sessions, geo-location, transaction type, user transaction history, and/or third-party information feeds (e.g., credit bureau feeds, financial institution feeds), etc. Using these factors, the likelihood that the individual attempting the transaction is in fact the user can be assessed based on the activity log of the user. A level of required authentication can be assigned to the user based on that likelihood on a per transaction basis. In one embodiment, the more likely that the current transaction is being attempted by the user, the more relaxed the authentication level assigned to the transaction.

For example, a user logs into an online banking session initially using baseline authentication. The location of the user is recorded in the activity log with other factors such as an identified device, the internet protocol (IP) address of the device, and the time of the login. Based on the user's total history of activity, certain activities and/or factors may be defined in the activity log. In this example, the combination of these factors is identified in the activity log as a safe geo-location. Suppose that the user's online banking session then times out and the user tries to access online banking within a predetermined period of time from the same geo-location. Because, the user successfully authenticated and logged into online banking a short time ago from the same device in the same location, it is very likely that the user is attempting to log back in to online banking. Accordingly, the user would be presented with a light level of authentication rather than the baseline level of authentication.

In one embodiment, a user may define an authentication level to be used under specified circumstances. Consider that a user lives with roommates and does not wish the authentication level to be reduced to light authentication when the user is home regardless of whether an online banking session times out. Instead, in this embodiment, the user may select not to allow for light authentication (even if the situation exists in which it is allowed). Accordingly, when the user's online banking session times out, the user's defined authentication levels are implemented. Thus, users have some control over the implementation of the different levels of authentication. The user can choose to forego a lighter version of authentication, however they cannot forgo a stronger version of authentication (if the system determines that it is needed).

By dynamically employing authentication requirements based on the historical activity of a user as well as the context of the transaction being attempted (e.g., location, timing, originating device), authentication can be efficiently employed. Specifically, users are not encumbered with unnecessary security obstacles. Moreover, heightened security can be employed for anomalous activity. Thus, a user's security is flexibly implemented to best meet the needs of that specific user.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
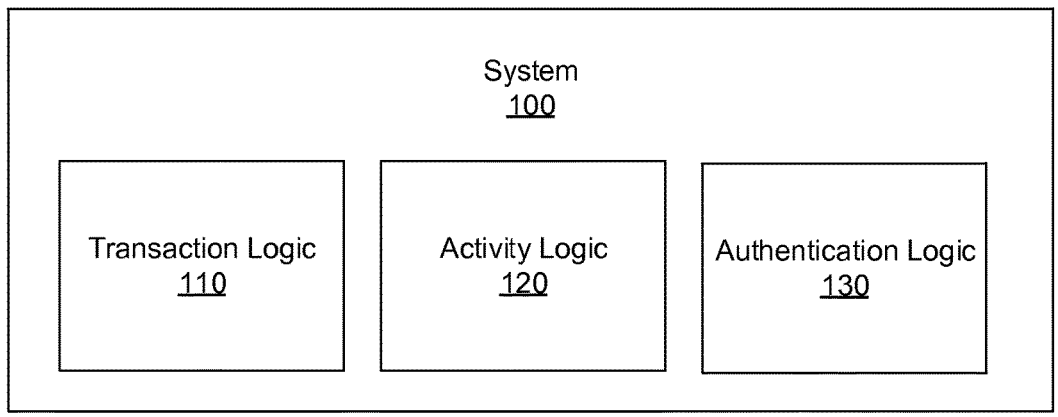
FIG. 1 illustrates one embodiment of a system associated with intelligent authentication.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with intelligent authentication systems.

FIG. 1 is an illustration of an example of a system 100 associated with intelligent authentication. The system 100 includes a transaction logic 110, an activity logic 120, and an authentication logic 130. The system 100 may operate in a computing system to verify the identities of users attempting to access electronic resources. In one embodiment, the system 100 is employed by a financial institution to assign a transaction made by user a level of authentication based on an assessment of the user's previous transactions.

The transaction logic 110 determines that a transaction requiring authentication is being attempted. In one embodiment, the transaction logic 110 intercepts an attempted transaction (i.e., an incoming request to access an electronic resource). The transaction logic 110 then determines if the attempted transaction requires authentication. The transaction logic 110 may be in communication with numerous resources via a network (internet, intranet, local area network (LAN), wireless local area network (WLAN), wide area network (WAN), metropolitan area network (MAN), etc.) in order to intercept attempted transactions.

In determining that a transaction has been attempted, the transaction logic 110 also receives transaction metadata (i.e., data about the transaction). For example, the transaction metadata may include metadata describing the type of transaction, location where transaction was attempted, device on which the transaction was attempted, and so on. The transaction logic 110 also identifies the user attempting the transaction. In one embodiment, a user is identified based on identity information (e.g., social security number, account number, username) provided by the user to attempt the transaction. In another embodiment, the transaction logic 110 may query the user for identifying information. For example, the user may be asked to provide a username or bankcard.

Alternatively, the transaction logic 110 may identify the user based on the transaction metadata associated with the attempted transaction. For example, the user may be identified based on a device (e.g., smart phone, tablet, laptop computer, wearable device, vehicle electronic system, desktop computer, etc.) being used to attempt the transaction. A user may be associated with a constellation of devices such as a mobile phones, tablet computers, laptop computers, desktop computers, and so on. Each device may be associated with device data (e.g., IP address, media access control (MAC) address, device identification alphanumeric). If the device from which the attempted transaction originated is associated with a user, then that user is assumed to be the user attempting the transaction. Accordingly, the transaction metadata can be used to identify the user.

In another embodiment, the user may be identified using a geo-location of the user. Specifically, the user may be identified based on the geo-location of the device that the user is associated with. For example, the device may be considered to be bound to the user based on the amount of time the user has logged on the device, the number of transactions the user has performed using the device, the user having registered the device and so on. The user's geo-location may be known by employing a global positioning system of the device or by querying the device.

The activity logic 120 accesses an activity log for the identified user. The activity log stores values of factors related to previous transactions in which the user has participated. For example, the factors include information such as time between sessions, geo-location, transaction type, customer transaction history, and/or third-party information feeds (e.g., credit bureau feeds, financial institution feeds). For example, the factor representing geo-location may have a number of values that represent locations where the user has been, such as home, work, ATMs, etc. The values of a factor may be arranged in classes. In the given example, a class of values may include locations that the user frequents (i.e., locations the user has been more than 25 times, locations the user has conducted transactions from more than 15 times, or locations the user has spent a certain percentage of their life cycle as a user). Other classes may include locations that the user has been on a single occasion, locations the user travels to moderately, and so on.

In another embodiment, the values are ranges. For example, a value characterized as home for the factor geo-location may be represented by a range of values representing a region, such as a number of global positioning system coordinates. As another example, the factor a value characterized as typical duration for the factor online banking session duration may be represented by a range of values between ten and twenty minutes. Accordingly, the metadata of the transaction may not have to be an exact match to a value of a factor. Instead, the metadata of the transaction may fall within a range of values.

In one embodiment, the activity logic 120 changes the class of a value based on the definition of the class. For example, when a user accesses an ATM for the 26$^{th}$ time, the activity logic moves the geo-location value associated with the ATM to the class of values for locations that the user frequents. Accordingly, the activity logic manages the values for the factors by assigning and reassigning the values to classes.

The activity logic 120 determines a degree of likelihood that the current transaction is being attempted by the user based on the activity log. Specifically, the activity logic 120 compares the transaction metadata of the attempted transaction with the factors describing the user's previous transactions to assess whether the attempted transaction is congruent with the user's previous activity. If the activity is congruent, the activity logic 120 determines that it is the user attempting the transaction and not a fraudster impersonating the user.

In one embodiment, the activity logic 120 employs thresholds to determine whether the attempted transaction is in fact being made by the user. For example, the activity logic 120 defines the thresholds based on whether or not the attempted transaction is (1) routine for the user and thus very likely the user, (2) reasonable for the user and thus possibly the user, or (3) anomalous for the user and thus unlikely to be the user. In the example discussed above, a user has logged in to an online baking session from a computer identified as the user's home computer. If the session times out and the user attempts to log back in via the user's home computer within a predetermined time (e.g., 20 minutes), the activity logic 120 determines that it is very likely the user attempting to log back into an online banking session is the user.

The authentication logic 130 applies a level of authentication to the attempted transaction based on the determination of the activity logic 120 despite any standardized authentication. The user may also select a level of authentication from a spectrum of authentication levels. For example, as described above, the authentication levels may include light, baseline, and heightened. In this example, the levels of authentication correspond to severity of the requirements to authenticate a user. For example, light authentication may require that a user enter a single piece of information (e.g., PIN) or biometrics (e.g., fingerprint, iris recognition, retina recognition facial recognition, hand geometry recognition, signature recognition, typing recognition, voice recognition, etc.). Baseline authentication may include preset authentication techniques for the electronic resource. For example, a bank card and PIN may be required to access an ATM or a username and password combination may be required to access online banking tools. Heightened authentication may include additional authentication techniques to be used in conjunction with the baseline authentication. For example, a user may have to respond to a security question or enter an alphanumeric sent to the user via a known device.

In one embodiment, while the user may be able to select authentication levels, the user cannot subvert an authentication level assigned by the authentication logic 130. For example, if the user selects a light authentication level, but the authentication logic 130 deems the transaction to merit a baseline or heightened authentication level, the authentication level assigned by the authentication logic 130 controls. The authentication level assigned by the authentication logic 130 controls because it is higher than the authentication level selected by the user. Likewise, if the authentication logic 130 assigned a baseline authentication logic, but the user selected a heightened authentication level, the heightened authentication level controls because it is a more stringent form of authentication than the baseline authentication. Therefore, the higher authentication level, whether it is chosen by a user or the authentication logic 130 controls in order to ensure the stricter security guidelines to protect the user.

For example, in the scenario described above, the activity logic 120 determines that it is very likely that the user is attempting to log back in to an online banking session that has timed out. Thus, the authentication logic 130 applies a light level of authentication to the attempted transaction rather than the standard authentication. For instance, the authentication logic 130 may request a PIN rather than the username and password combination typically required. Alternatively, the authentication logic 130 may provide a biometric entry that the user can easily provide with very little inconvenience. Thus, the authentication logic 130 changes the level of authentication required to complete the attempted transaction based on the user's previous activity.

Figure 2:
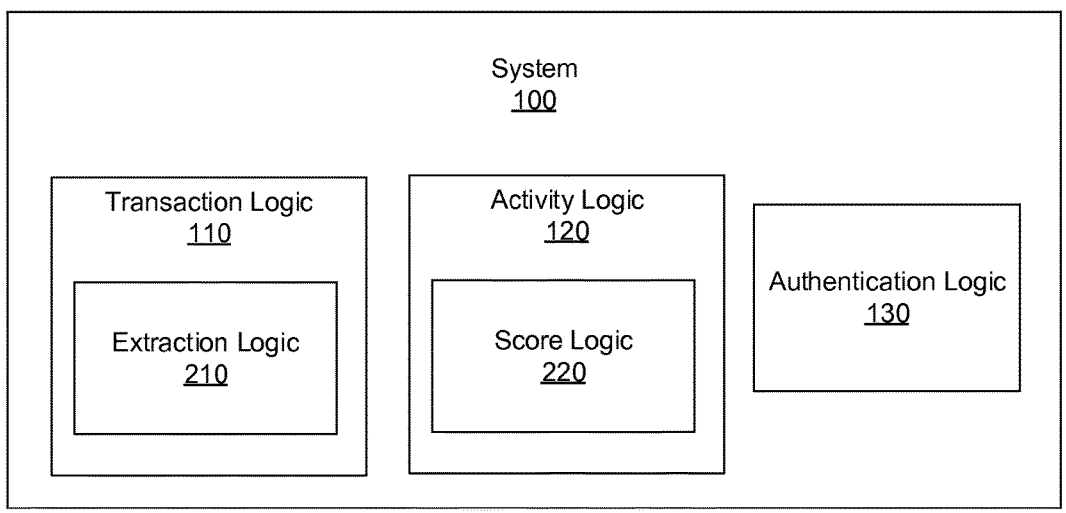
FIG. 2 illustrates one embodiment of a system having an extraction logic and score logic associated with intelligent authentication.

FIG. 2 is an illustration of another embodiment of a system 100 associated with intelligent authentication. The transaction logic 110, the activity logic 120, and the authentication logic 130 operate in a similar manner as described above with respect to FIG. 1. Additionally, the activity logic 120 includes an extraction logic 210 and a score logic 220.

In the embodiment shown in FIG. 2, an extraction logic 210 extracts activity metadata from previous transactions. The extracted metadata is categorized according to the factors. For example, in one embodiment activity metadata is extracted from a previous transaction. Metadata corresponding to a location is categorized as a value for the geo-location factor. In one embodiment, the activity metadata is associated with extensible markup language (XML) tags. The XML tags can then be used to categorize the activity metadata as values of the factors. Accordingly, the extraction logic 210 transforms the activity metadata as values for the different factors.

In another embodiment, the extraction logic 210 receives transaction metadata from the transaction logic 110 once the transaction has been performed. The transaction metadata can be categorized according to the factors in a similar manner as the activity metadata. Accordingly, once the transaction has been performed the transaction metadata is transformed so that subsequent transactions can be compared to the current transaction.

As discussed above, the activity metadata is transformed to be values categorically arranged according to the factors. The activity logic 120 assigns a score to the attempted transaction using the score logic 220. The score is a quantitative representation of the degree of likelihood that the purported user is in fact the user and not a fraudster impersonating the user. The score logic 220 calculates the score based on the comparison of transaction metadata compared to the factors enumerated in the activity log. In one embodiment, the score is directly proportional to the likelihood that the user is the user.

Each class may be assessed a number of points based on the relative security of the class. For example, an attempted transaction originating from a location that the user frequents makes it more likely that the user initiated the attempted transaction. Accordingly, the class of values corresponding to locations the user frequents may be assigned more points than the class of values corresponding to locations where the user has only been once. While this example pertains to a single factor, geo-location, the values of each factor may be classified in this manner. Furthermore, multiple factors may be used in combination. Alternatively, points may be assigned to values on an individual basis without first classifying values.

The score logic 220 calculates a score for a transaction based on the values of associated factors for the transaction. For example, the score logic 220 may sum the points assigned to the values that represent the attempted transaction. Accordingly, the points corresponding to a class having a value associated with the attempted transaction can be combined to calculate a score for the attempted transaction. Alternatively, the score logic 220 may use a function or algorithm in conjunction with the points assigned to the values to calculate a score.

The score logic 220 may further employ weighting to calculate a score. In one embodiment, some factors may be assigned more weight than other factors. For example, the factor corresponding to an originating device may be given more weight than the geo-location of the user when the transaction is attempted. Accordingly, a transaction being attempted on a device the user frequently uses is most like being performed by the user. Thus, the score logic 220 can be configured to prioritize metadata about the attempted transaction by weighting factors. The score can then be calculated to emphasize the factor that is the largest security concern.

For example, consider that in addition to considering the previous activity of the user, the activity logic 120 may analyze the current transaction. For example, the activity logic 120 may perform proximity link analysis. The proximity link analysis identifies the geo-location of the device used to attempt a transaction and determines whether any devices known to bad devices are within a predetermined radius. Thus, in one embodiment the activity logic 120 access transaction data for other devices. For instance, there may be a database for aggregating a list of devices previously used to commit fraud. Suppose that the transaction is being attempted on a device within one hundred feet of a device that is known to have been used to commit fraudulent transactions. The score logic 220 may calculate a lower score for the attempted transaction based on the proximity of the "bad" device. Accordingly, the score logic 220 bases the calculation of a score for the attempted transaction based on the proximity link analysis performed by the activity logic 120.

Figure 3:
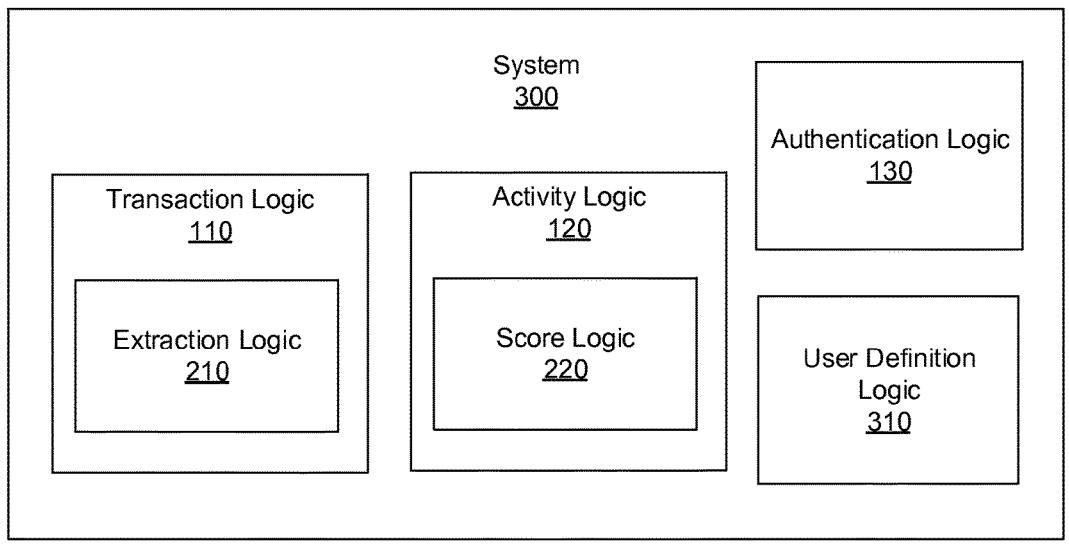
FIG. 3 illustrates another embodiment of a system having a user definition logic associated with intelligent authentication.

FIG. 3 is an illustration of another embodiment of a system 300 having a user definition logic 310 associated with intelligent authentication. The transaction logic 110, the activity logic 120, the authentication logic 130, extraction logic 210 and score logic 220 operate in a similar manner as described above with respect to FIG. 2.

The user definition logic 310 manages rules defined by the user that define how to employ authentication levels. For example, the user definition logic 310 may receive a rule from the user that defines a set of circumstances and a desired authentication level. For example, the user may wish to set up certain devices to use light authentication when the device is being used at a specific geo-location, such as home. Thus, the user definition logic 310 allows a user to select the desired circumstances as well as the desired authentication level.

In one embodiment, the user definition logic 310 uses the activity logic 120 to provide a hierarchical arrangement of the factors and values of the factors. For example, the user definition logic may access the activity log of the activity logic 120 in order to provide the geo-location factor as a selectable button. When selected, a drop down menu may appear that illustrates the values associated with the geo-location factor. Rather than illustrating every value associated with a factor, in one embodiment the user definition logic 310 generates a subset of the values recorded in the activity log. For example, with regard to the geo-location factor, the user definition logic 310 may display the most recent 25 locations where the user has performed a transaction. In another example, the user definition logic 310 may display the 25 most frequently visited locations. These examples are given to demonstrate the versatility of the user definition logic 310. The other factors may be treated in a similar manner.

A user selects at least one value used to describe a user experience. For example, a user may select values that reflect an online banking session on the user's device, timing out when the user is at home. Accordingly, a user may select factors for a type of transaction, device used, and geo-location. For each one of those factors, the user may select values such as online banking, home computer, and home, respectively.

The values may be selectable such that a user can select the values related to circumstances, which the user is trying to isolate. The user definition logic 310 also allows the user to define an authentication level to be used given the user's selected values that correspond to a user experience. Accordingly, the users have some control over the implementation of the different levels of authentication. In this manner, a user is able to tailor their experience interacting with electronic resources.

Figure 4:
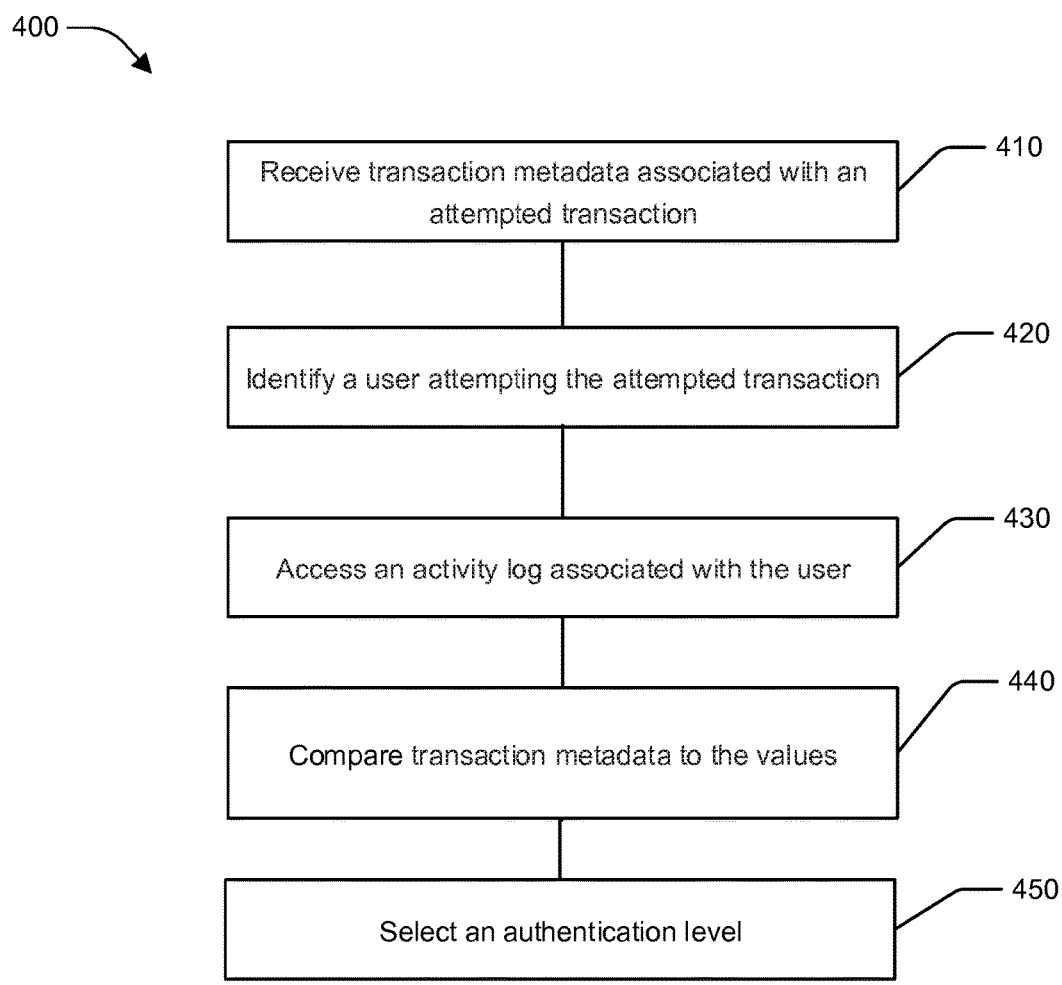
FIG. 4 illustrates one embodiment of a method associated with intelligent authentication.

FIG. 4 illustrates one embodiment of a method associated with intelligent authentication. At 410, transaction metadata associated with an attempted transaction s received. The transaction metadata may include the type of transaction, location where transaction was attempted, and device on which the transaction was attempted. In one embodiment, the transaction metadata is stored in a memory. At 420, a user attempting the transaction is identified.

In one embodiment, the user is identified based on the transaction metadata. For example, a user may be identified based on a geolocation where the attempted transaction originated. Specifically, the geolocation may be associated with the user (i.e., the geolocation may be classified as the user's home or workplace). Additionally or alternatively, a user may be associated with a constellation of devices such as a mobile phones, tablet computers, laptop computers, desktop computers, and so on. Accordingly, the user can be identified as a user based on the device used to attempt the transaction. In another embodiment, the user may be identified based on values in the activity log (i.e., the activity logic 120 as described above with respect to FIG. 1). For example, if the transaction metadata corresponds to a predetermined number of values in a user's activity log, that user may be identified as having attempted the transaction.

At 430, an activity log associated with the user is accessed. The activity log includes values corresponding to previous transactions made by the user. As discussed above, the activity log records values related to the transactions in which the user has participated. The values include information associated with factors such as time between sessions, geo-location, transaction type, customer transaction history, and/or third-party information feeds (e.g., credit bureau feeds, financial institution feeds).

At 440, the transaction metadata is compared to the factors of the activity log to determine the likelihood that the user is in fact the user. For example, the location that the attempted transaction originated from is compared to locations that the user previously conducted transactions. At 450, an authentication level for the transaction is selected based, at least in part, on the comparison. For example, in response to a match being identified between the transaction metadata and the values of the activity log, an authentication level is selected.

In one embodiment, there is a matching threshold for each authentication level. For example, as described above, three authentication levels may be defined: light, baseline, and heightened. For example, if the transaction metadata matches 25 instances of a value of a particular factor, then the authentication level is set to light. If the transaction metadata matches 1-24 instances of a value of a factor, then the baseline authentication may be selected. If there are no instances of the transaction metadata, the heightened authentication level may be selected.

A heightened authentication level may be selected if values of the activity log preclude the user from being the user and the attempted transaction should be denied. For example if the activity log records a previous transaction at an ATM in New York City, N.Y., and then an hour later a transaction is attempted at an ATM in Los Angeles, Calif., then the attempted transaction may be subject to the heightened authentication level based on the geo-location factor. Thus, the system can identify patterns and impossibilities for users and select authentication levels for current transactions accordingly. In this manner, authentication levels and corresponding authentication techniques are selected based on the user and the user's previous transactions.

Figure 5:
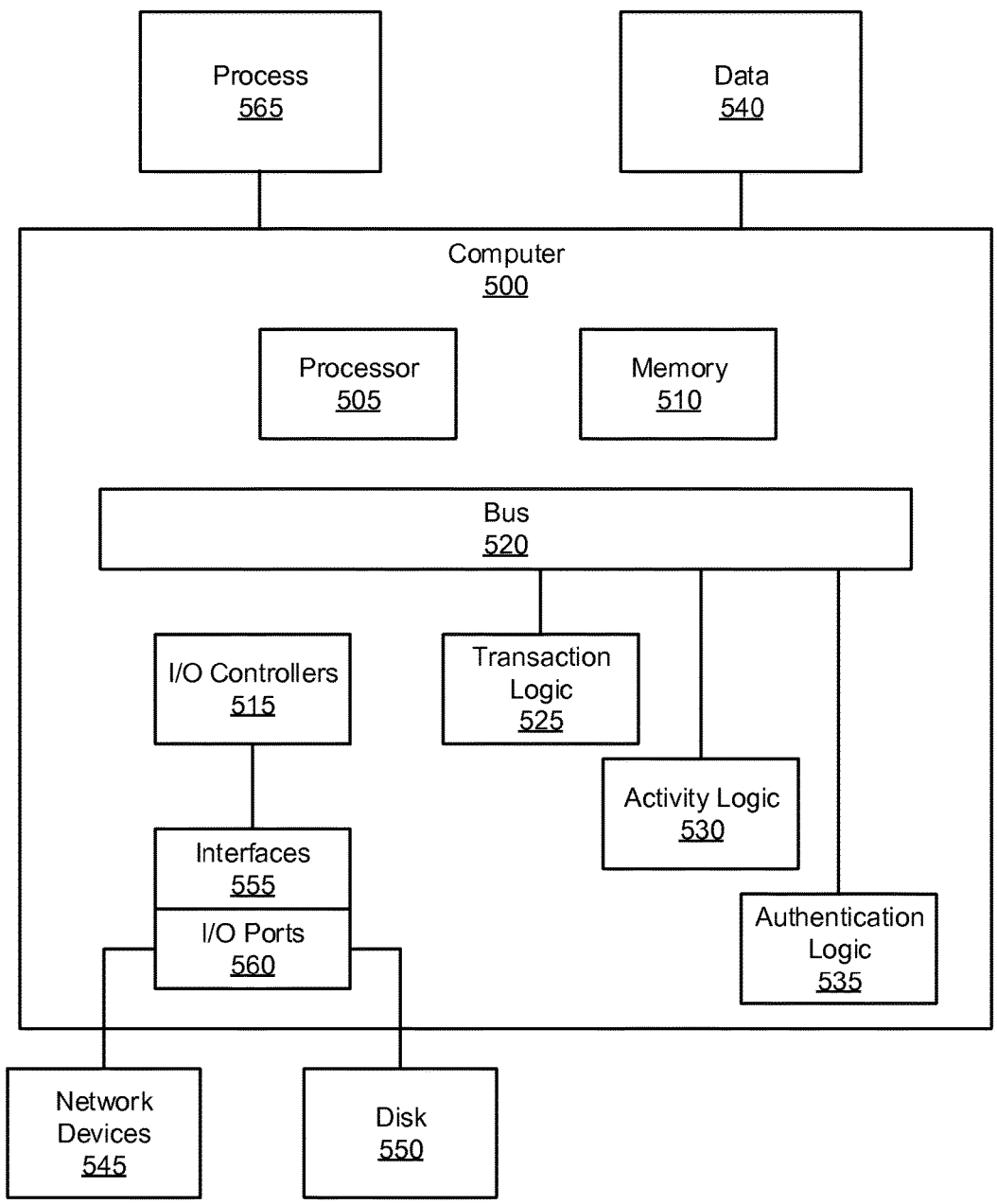
FIG. 5 illustrates one embodiment of an example computer environment associated with intelligent authentication.

FIG. 5 illustrates one embodiment of an example computer environment associated with intelligent authentication. The computer environment in which the systems and methods described herein, and equivalents, may operate may include a computer 500. The computer includes a processor 505, a memory 510, and input/output (I/O) ports 515 operably connected by a bus 520. In one example, the computer 500 may include a transaction logic 525, an activity logic 530, and an authentication logic 535. The transaction logic 525 is configured to determine that a transaction requiring authentication is being attempted. The transaction logic 525 is further configured to identify a user attempting the transaction. The activity logic 530 is configured to accesses an activity log for the user and determine the likelihood that the transaction is being attempted by the user. The authentication logic 535 is configured to apply a level of authentication to the attempted transaction.

In different examples, the transaction logic 525, the activity logic 530, and the authentication logic 535 may be implemented in hardware, a non-transitory computer-readable medium with stored instructions, firmware, and/or combinations thereof. While the transaction logic 525, the activity logic 530, and the authentication logic 535 are illustrated as hardware components attached to the bus 520, it is to be appreciated that in one example, the transaction logic 525, the activity logic 530, and/or the authentication logic 535 could be implemented in the processor 505. Moreover, an activity log accessed by the activity logic 530 may be stored in the memory 510.

In one embodiment, transaction logic 525 is a means (e.g., hardware, non-transitory computer-readable medium, firmware) for determining that a transaction requiring authentication is being attempted and for identifying a user attempting the transaction. The activity logic 530 is a means (e.g., hardware, non-transitory computer-readable medium, firmware) for accessing an activity log for the user and determining the likelihood that the transaction is being attempted by the user. The authentication logic 535 is a means (e.g., hardware, non-transitory computer-readable medium, firmware) for applying a level of authentication to the attempted transaction. The means may be implemented, for example, as an application specific integrated circuit (ASIC) programmed to facilitate data editing in a web-based interactive web response system. The means may also be implemented as stored computer executable instructions that are presented to computer 500 as data 540 that are temporarily stored in memory 510 and then executed by processor 505.

Generally describing an example configuration of the computer 500, the processor 505 may be a variety of various processors including dual microprocessor and other multiprocessor architectures. The memory 510 may include volatile memory and/or non-volatile memory. Non-volatile memory may include, for example, ROM, PROM, and so on. Volatile memory may include, for example, RAM, SRAM, DRAM, and so on.

Network device 545 and a disk 550 may be operably connected to the computer 500 via, for example, an I/O interfaces (e.g., card, device) 555 and an I/O ports 560. The disk 545 may be, for example, a magnetic disk drive, a solid state disk drive, a floppy disk drive, a tape drive, a Zip drive, a flash memory card, a memory stick, and so on. Furthermore, the disk 545 may be a CD-ROM drive, a CD-R drive, a CD-RW drive, a DVD ROM, and so on. The memory 510 can store data 540 and/or a process 565, for example. The disk 550 and/or the memory 510 can store an operating system that controls and allocates resources of the computer 500.

The bus 520 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 520 can be types including, for example, a memory bus, a memory controller, a peripheral bus, an external bus, a crossbar switch, and/or a local bus.

The computer 500 may interact with I/O devices via the I/O interfaces 555 and the I/O ports 560. Input/output devices may be, for example, a keyboard, a microphone, a pointing and selection device, cameras, video cards, displays, the network devices 545, the disk 550, and so on. The I/O ports 560 may include, for example, serial ports, parallel ports, and USB ports.

The computer 500 can operate in a network environment and thus may be connected to the network devices 545 via the I/O interfaces 555, and/or the I/O ports 560. Through the network devices 545, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
  a transaction logic configured to:
    receive transaction metadata associated with an attempted transaction; and
    identify a user attempting the attempted transaction;
  an activity logic configured to:
    access an activity log associated with the user, wherein the activity log includes information associated with previous transactions made by the user;
    compare transaction metadata to the information, and identify a particular previous transaction of the previous transactions that matches the transaction metadata within a predetermined range of similarity; and
  an authentication logic configured to select an authentication level for the transaction based, at least in part, on an authentication class of the particular previous transaction,
    wherein the authentication level is associated with a likelihood that the user is the same as the user associated with the particular previous transaction based at least in part on factors of the authentication class; and
  wherein the activity logic manages the values for the factors by assigning and reassigning the values to classes, wherein classes are based at least in part on an activity log of the identified user.

2. The system of claim 1, wherein the information comprises values corresponding to the previous transactions and are arranged according to factors related to the previous transactions.

3. The system of claim 1, wherein the authentication logic is configured to select the authentication level from a group of authentication levels, and wherein authentication levels are associated with different authentication techniques.

4. The system of claim 1, further comprising:
a score logic configured to calculate a score for the attempted transaction based on the information.

5. The system of claim 4, wherein the score is directly proportional to the likelihood that the user is the user.

6. The system of claim 1, further comprising:
a user definition logic configured to receive rules set by a user, wherein the rules define implementation of the authentication levels.

7. The system of claim 6, wherein the user definition logic is further configured to:
provide a list of selectable values corresponding to the factors;
receive selections of at least one selectable value by a user; and
generate a definition that defines an authentication level to be implemented when a transaction is associated with the at least one selectable value.

8. A method, comprising:
receiving transaction metadata associated with a transaction attempted by a user;
accessing an activity log associated with the user, wherein the activity log includes values corresponding to previous transactions made by the user;
comparing the transaction metadata to the values in the activity log, wherein the comparing comprises identifying a previous transaction of the previous transactions that matches the transaction metadata within a predetermined range of similarity based on a value of the previous transaction;
determine a threshold indicating whether the transaction is being attempted by the user based, at least in part on the comparison; and
selecting an authentication level for the attempted transaction from a plurality of authentication levels based, at least in part, on the threshold and an authentication class of the previous transaction,
wherein the authentication level is associated with a likelihood that the user is the same as the user associated with the previous transactions based at least in part on factors of the authentication class; and
wherein the determining manages the values for the factors by assigning and reassigning the values to classes, wherein classes are based at least in part on an activity log of the identified user.

9. The method of claim 8, wherein the authentication level is configured to deny the attempted transaction.

10. The method of claim 8, wherein the plurality of authentication levels includes light authentication, baseline authentication, and heightened authentication, and wherein the light authentication corresponds to techniques that require less user intervention than the heightened authentication.

11. The method of claim 8, wherein factors are associated with the values.

12. The method of claim 11, wherein the activity log is configured to arrange values of factors into classes.

13. The method of claim 12, wherein classes are associated with points, and wherein determining a threshold comprises calculating a score for the transaction based, at least in part, on the points assigned to the classes of the values associated with the transaction.

14. The system of claim 8, wherein the threshold indicates the likelihood that the user is the user.

15. A non-transitory computer-readable medium storing computer-executable instructions that when executed by a computer cause the computer to perform a method, the method comprising:
receiving transaction metadata associated with a transaction attempted by a user;
accessing an activity log associated with the user, wherein the activity log includes values corresponding to previous transactions made by the user;
determining factors of an authentication class corresponding to previous transactions made by the user;
determining whether the user has a definition corresponding to the values, wherein the definition is associated with a defined authentication level;
in response to determining that the user does not have a definition, calculating a score for the transaction based on a comparison of the transaction metadata to the values of the previous transactions, wherein the score is associated with a likelihood of an identification of the user based at least in part on factors of the authentication class;
comparing the score to a plurality of predetermined thresholds; and
selecting an authentication level to implement from the plurality of authentication levels based, at least in part, on the score satisfying the predetermined thresholds; and
wherein the determining manages the values for the factors by assigning and reassigning the values to classes, wherein classes are based at least in part on an activity log of the identified user.

16. The method of claim 15, further comprising in response to determining that the user does have a definition, implementing the authentication level defined in the definition.

17. The method of claim 15, wherein the score is calculated based, at least in part, on a likelihood the attempted transaction is fraudulent.

18. The method of claim 15, wherein the values correspond to factors arranged hierarchically.

19. The method of claim 15, wherein identifying a user comprises identifying a geolocation where the attempted transaction originated as a geolocation associated with the user.

20. The method of claim 15, wherein identifying a user comprises identifying a device used to originate the transaction as a known device of the user.

* * * * *